United States Patent [19]
Maeda et al.

[11] Patent Number: 4,534,535
[45] Date of Patent: Aug. 13, 1985

[54] DAMPING SUPPORT FOR PIPING SYSTEM

[75] Inventors: Katsutoshi Maeda, Chigasaki; Ikuo Shimoda, Fujisawa, both of Japan

[73] Assignees: JGC Corporation; Oiles Industry Co., Ltd., both of Tokyo, Japan

[21] Appl. No.: 426,907

[22] Filed: Sep. 29, 1982

[30] Foreign Application Priority Data

Oct. 2, 1981 [JP] Japan ................. 56-156177

[51] Int. Cl.³ .......................... F16M 13/00
[52] U.S. Cl. .................... 248/636; 248/49; 248/55
[58] Field of Search ............. 248/636, 562, 49, 55, 248/568, 569, 65, 74.4; 52/167; 308/3 A

[56] References Cited

U.S. PATENT DOCUMENTS

| | | | |
|---|---|---|---|
| 2,319,735 | 5/1943 | Hussman | 248/562 X |
| 2,378,343 | 6/1945 | Walter | 308/3 A |
| 2,561,540 | 7/1951 | Sherbrooke | 248/49 |
| 3,023,990 | 3/1962 | Gunthel | 248/74.4 X |
| 3,263,954 | 8/1966 | Bratoff | 248/568 |
| 3,730,463 | 5/1973 | Richard | 52/167 X |
| 3,963,205 | 6/1976 | Hageman | 248/55 |
| 3,980,262 | 9/1976 | Lee | 248/49 X |
| 4,076,194 | 2/1978 | Feucht | 248/569 |
| 4,141,527 | 2/1979 | Wolf | 248/562 |
| 4,330,103 | 5/1982 | Thuries et al. | 52/167 X |

FOREIGN PATENT DOCUMENTS 872725 7/1961 United Kingdom ............. 248/562

*Primary Examiner*—J. Franklin Foss
*Attorney, Agent, or Firm*—Oblon, Fisher, Spivak, McClelland & Maier

[57] ABSTRACT

A fixed base is formed at its upper surface with a recess portion, and a bottom surface of said recess portion is normally formed into a plane. A movable plate is disposed in the recess portion of said fixed base with a moving region left therein. Spacers are projectingly embedded in the lower surface of said movable plate, and a gap is formed between the bottom surface of the recess portion of the fixed base and the lower surface of the movable plate, said gap being filled with a viscous material. A pipe is disposed on the movable plate through a support base. The vibration of the pipe is transmitted to the movable plate to produce a relative motion between two surfaces, one being the lower surface of the movable plate and the other being the bottom surface of the recess portion of the fixed base. The viscous shearing resistance of the viscous material resulting from said motion displays an excellent vibration-absorbing action.

19 Claims, 2 Drawing Figures

DAMPING SUPPORT FOR PIPING SYSTEM

BACKGROUND OF THE INVENTION

1. Field of the Invention

This invention relates to an apparatus for piping system and more specifically to an apparatus for piping system which can be used to prevent vibrations resulting from a flow of fluid within piping or the like, or to disperse a vibration stress generated in a piping system due to earthquakes.

2. Description of the Prior Art

Prior art apparatus for piping system for vibration proofing (sway brace) includes (1) a spring type vibration proof apparatus and (2) a hydraulic vibration proof apparatus (i.e. oil damper). The spring type vibration proof apparatus (1) above has advantages in that the construction thereof is relatively simple, and the characteristic frequency of the entire piping system can be increased readily to avoid the resonance frequency resulting from the distance and the like. However, it suffered from disadvantages in that the expansion of piping caused by thermal expansion thereof is inconveniently restrained, a limitation involves in large capacity systems in view of the manufacture of springs, and the like. On the other hand, the hydraulic vibration proof apparatus (2) above has advantages in that the resonance frequency may be successfully reduced, the apparatus may follow freely the expansion of piping with little restriction, systems of large capacity may be manufactured relatively freely, and the like. However, the apparatus is poorly responsive to the amplitude of fine vibrations or to the vibrations of high frequency, thus failing to expect the effect, and seals are always subjected to internal stress, and as a result the seals tend to be damaged, and the like.

In Japanese Patent Publication No. 51-47903 of Hitachi Ltd., there is disclosed a technique in which the vibration of pipe is converted into motion of heat resisting particles such as sand through a movable member so that vibrations in a radial and axial direction of pipe may be prevented by friction between said heat-resisting particles. By use of this conventional technique, it is possible to prevent vibrations in multiple directions and to obtain a heat resisting small-size vibration proof apparatus for piping. However, this conventional apparatus is not good in responsiveness with respect to the absorption of vibrations, since the friction between the particles is utilized. Particularly, the absorption factor is poor with respect to fine vibrations, and the resonance phenomenon occurs. Also, in case of great vibrations, a large friction is produced resulting in adverse effects such as shocks.

SUMMARY OF THE INVENTION

This invention provides a novel support for piping system which has overcome all these problems as noted above with respect to prior arts.

The present invention has been achieved by aiming at the vibration absorbing action of the viscous shearing resistance resulting from the relative motion of a viscous material present in a clearance between two surfaces.

It is an object of the present invention to provide a damping support for a piping system which can absorb vibrations smoothly irrespective of the magnitude thereof and which produces no harmful internal stress.

The support for a piping system in accordance with the present invention has various excellent effects as noted below:

(1) The present system is simple in construction but it therefore can be manufactured at less cost, and also displays an excellent damping function despite its simple construction.

(2) The present system is not controlled only in one direction, which moving direction is made free. Therefore, the designing of the piping support is made substantially free.

(3) A displacement of vibrations transmitted to the present system is smoothly absorbed irrespective of the magnitude of velocity and the magnitude of amplitude, and the greater the velocity, the greater the resistance that will be produced. Thus, the displacement stops rapidly. Particularly, since even the fine vibrations are absorbed early, even if said vibrations are vibrations (resonance) which coincides with the characteristic frequency, the value of responsiveness thereof can be reduced.

(4) Since pressure in the viscous fluid is not increased even if resistance is produced in the viscous fluid, a seal device need not be provided as has been required in conventional oil dampers. Therefore, no reduction in performance results from damage to such a seal.

(5) A slow change in expansion of the piping resulting from the thermal expansion can be absorbed in a moving region, and the system may freely follow the expansion of the piping.

(6) The installation work of the present system on the position where piping is arranged may be accomplished easily, and the adjustment of the system to a horizontal position may be done simply.

The present invention is based on a basic technical idea which comprises the following configurations. (1) The support for a piping system in accordance with the present invention comprises a fixed base, a movable means, a spacing holding means, and a viscous material. (2) The fixed base has a recess portion whose upper surface is surrounded by an enclosure. (3) The movable means is disposed within the recess portion of said fixed base with a moving region left therein and is moved in cooperation with the pipe. (4) The spacing holding means has a function to hold a lower surface of said movable means in a predetermined spaced relation from the bottom surface of the recess portion. (5) The viscous material is filled in a gap formed between the lower surface of said movable means and the bottom surface of the recess portion of said fixed base.

In the aforementioned basic technical idea, the "enclosure" does not indicate a special member, but an inner wall surface formed when a recess portion is formed above the fixed base corresponds to the enclosure. As for the "spacing holding means", any means can be employed as long as the aforesaid function is accomplished.

BRIEF DESCRIPTION OF THE DRAWINGS

An embodiment of the present invention will now be described by way of example and with reference to the accompanying drawings, in which.

DESCRIPTION OF THE PREFERRED EMBODIMENT

Figure 1:
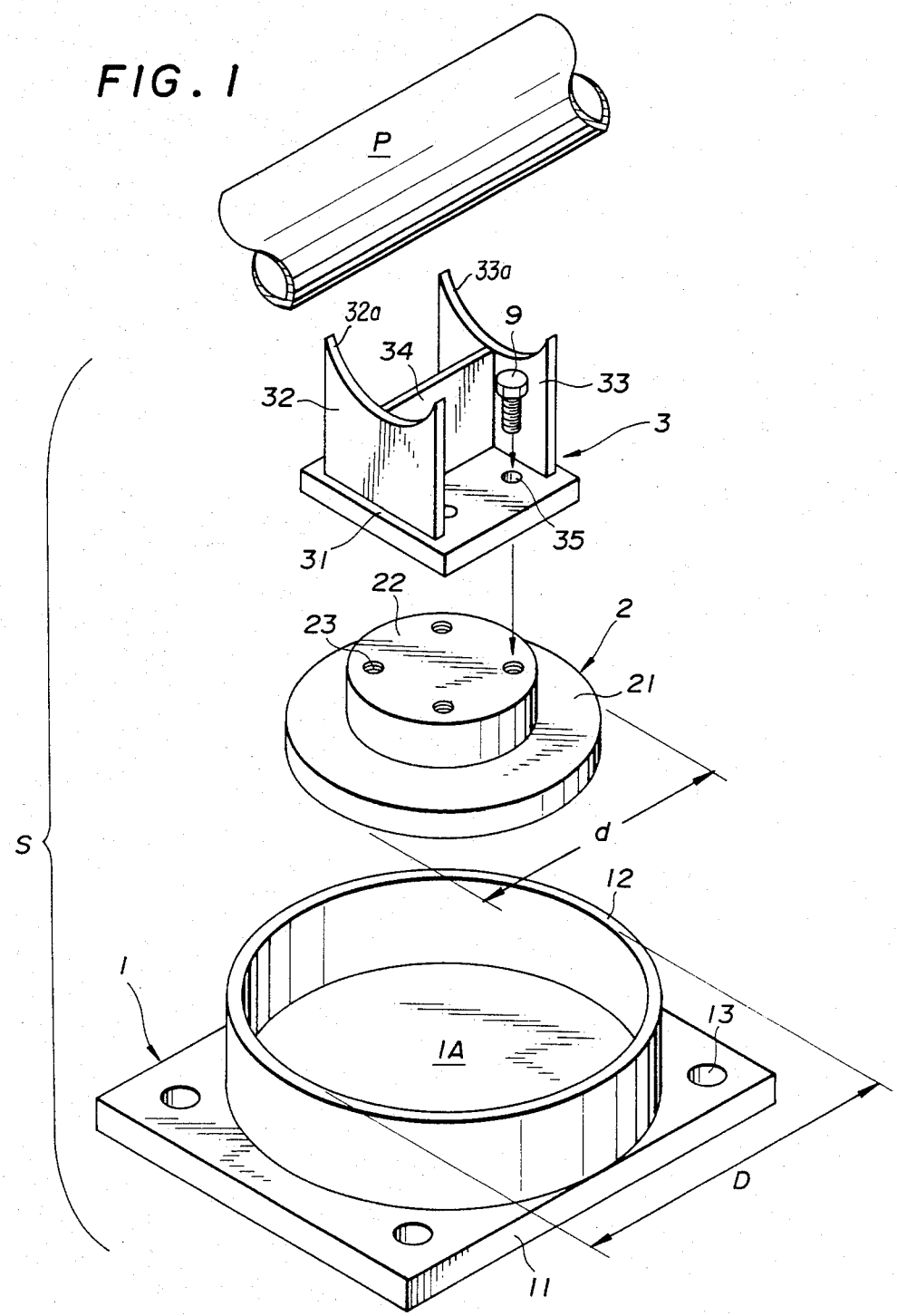
FIG. 1 is an exploded perspective view of an optimum embodiment of a damping support for piping system in accordance with the present invention.

The numerals in the different views identify identical parts. A fixed base indicated at 1 comprises a fixed flat plate 11 and a cylindrical enclosure 12 projectingly mounted in the central portion on said fixed base. An upper surface of the fixed flat plate 11 and an inner wall surface of the enclosure 12 constitute a recess portion 1A. Reference numeral 13 denotes an anchor hole. The fixed base 1 is secured by inserting fastening bolts mounted on a bed B into said anchor holes 13 and tightening nuts, or directly welding the fixed base 1 on the bed B without provision of the anchor holes 13.

A movable plate indicated at 2 comprises a lower portion 21 of a disc-like movable plate having a large diameter and an upper portion 22 of a movable plate having a small diameter. Numeral 23 denotes a bolt hole perforated in the movable plate upper portion 22.

Numeral 3 denotes a support base in which vertical wall plates 32, 33 and a central connecting plate 34 are assembled on the upper surface of a flat plate 31. The flat plate 31 is substantially square, which size is included in the size of said movable plate lower portion 21. The vertical wall plates 32, 33 have upper surfaces 32a, 33a circularly formed on which a pipe P is mounted by fastening means such as welding. Numeral 35 designates a bolt hole perforated in the flat plate 31 and is provided corresponding to the bolt hole 23 of said movable plate.

The fixed base 1, the movable plate 2, and the support base 3 are normally formed of a steel material, but other materials having a strength similar to steel can be used. While the fixed base 1 and the movable plate 2 are normally assembled by welding, they can be integrally molded by casting.

Figure 2:
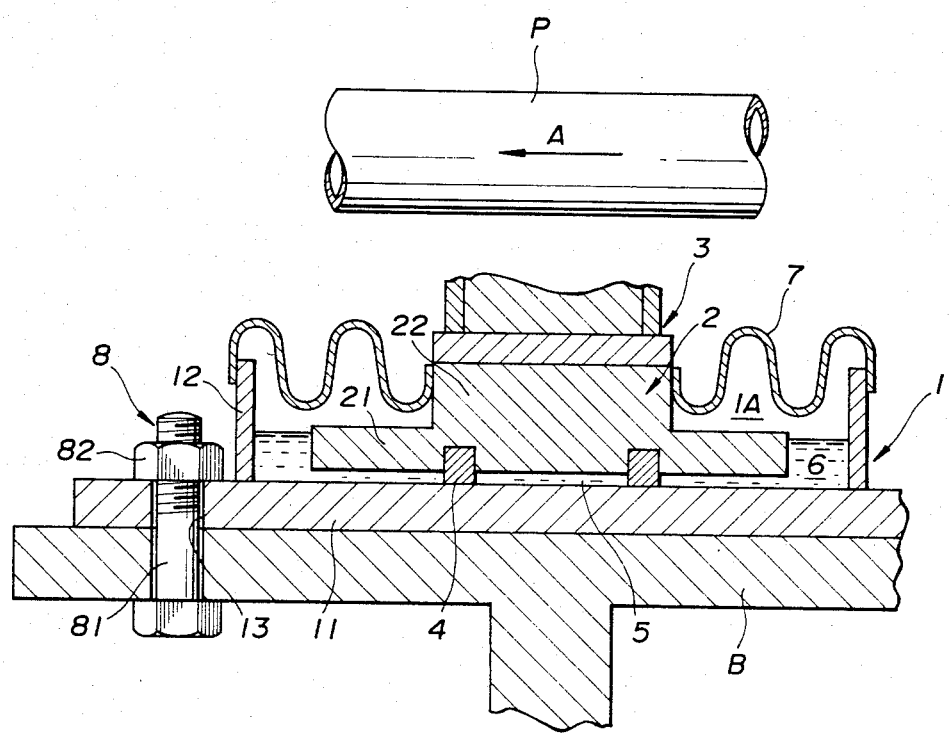
FIG. 2 is a longitudinal sectional view in the axial direction of an essential portion of the present apparatus.

The configuration which forms the characteristic of the present invention lies in the assembly and arrangement of the fixed base 1 and the movable plate 2, the details of which is shown in FIG. 2. That is, a spacer 4 is disposed on the lower surface of the movable plate 2, the spacer serving as the spacing holding means which holds said lower surface of the movable plate 2 in a predetermined spaced relation from the bottom surface of the recess portion 1A of the fixed base 1.

In the illustrated embodiment, the spacers 4 (which are at least three, and normally four, in number) by which the movable plate 2 can self-stand are embedded in the movable plate 2 so that they project from the lower surface thereof. The spacer is formed of a material (normally metal, and preferably high tensile brass) which is not easily worn when the spacer slidably contacts with the upper surface of the fixed flat plate 11, and the height of the gap 5 between the movable plate 2 and the lower surface is set to about 0.5 to 1 mm. The outside diameter d of the movable plate lower portion 21 is smaller than the inside diameter D of the cylindrical enclosure 12 of the fixed base, and both the elements 21 and 12 have an annular gap portion through a difference between said diameters. The diameters d and D are set according to the suitable condition.

By installing the movable plate 2 within the enclosure 12 of the fixed base 1, the gap 5 is formed through the amount of projection of the spacer 4 between the lower surface of the movable plate 2 and the upper surface of the fixed flat plate 11. Between the side of the movable plate 2 and the internal side of the enclosure 12 of the fixed plate 1 is produced a moving region through a difference in diameters therebetween over the whole area in the horizontal direction.

Numeral 6 denotes a viscous fluid which is poured into the enclosure 12 and filled up to a shoulder of the movable plate lower portion 21. As shown in FIG. 2, the viscous fluid enters and fills in the gap portion 5. The viscous fluid 6 used includes, besides a normal viscous material, viscous material of high viscosity (for example, high molecular viscous material such as polyisobutylene, polypropylene, polybutene, dimethylpolysiloxane, or asphalt, etc.) in order to increase the damping performance described later.

Numeral 7 denotes a bellow-like dust-proof cover, which is located over the enclosure 12 and the movable plate upper portion 22 to prevent invasion of dust or the like from outside into the viscous fluid 6.

Numeral 8 denotes a securing means for the fixed base 1, 81 a fastening bolt, and 82 a nut. In FIG. 1, numeral 9 denotes a bolt which is threadedly inserted into the bolt hole 35 of the support base 3 and bolt hole 23 of the movable plate upper portion 22 to secure the movable plate 2 to the support base 3.

In the present invention, the support S for piping system is assembled and installed, and the pipe P is mounted, in the following manner.

A predetermined quantity of viscous fluid 6 is poured into the enclosure 12 of the fixed base 1, thereafter the movable plate 2 with the spacers 4 embedded into the enclosure 12 is slowly sunk into the viscous fluid 6, the viscous fluid being sufficiently filled into the gap 5 in a manner to prevent entry of bubbles or the like therein, and the movable plate 2 is seated on the fixed flat plate 11.

Next, the dust-proof cover 7 is extended between the movable plate upper portion 22 and the enclosure 12. Thereafter, the support base 3 is secured onto the movable plate 2 integrally by means of the bolt 9 while the bolt holes 23, 35 thereof are registered.

The thus assembled piping support S is disposed on the bed B (or foundation) disposed at a position where a pipeline is installed, the anchor hole 13 of the fixed base 1 is fitted in the fastening bolt 81 mounted on the bed B, and the nut 82 is tightened. Next, the pipe P is disposed on the support base 3 of the piping support S, and the vertical wall plates 32, 33 and the pipe P are fixed.

The aforesaid installation work is easily accomplished and has the following advantages. Even if a minor horizontal displacement is present at the position of installation of the bed and the pipe P during the installation work, such a displacement is absorbed in the moving region of the enclosure 12 of the fixed base and the movable plate lower portion 21 to provide easy adjustment of position. In the assembly and installation of the piping support S, a further method can be employed which comprises securing the fixed base 1 onto the bed B through the fastening bolt 81, and thereafter, successively assembling the movable plate 2 and the support base 3 on the fixed base 1.

Next, the response of the piping support S of the present invention installed as described hereinbefore to the displacement (vibration and movement) of the pipe P will be described.

Assume now that the pipe P has received a force by which it is displaced in the direction A (FIG. 2). Both the support base 3 and movable plate 2 secured to the pipe P are also moved in the direction A, since they are slidably supported on the fixed base 1 through the spacers 4. That is, the movable plate 2 and the fixed base 1 are relatively displaced at a relative velocity v. However, since the gap 5 between the lower surface of the movable plate 2 and the upper surface of the fixed flat plate 11 is filled with the viscous fluid 6, a viscous shearing resistance is exerted thereon. The resisting force F due to the viscous shearing is generally proportional to the coefficient of viscosity $\mu$ of the viscous material, the area S of two surfaces which effects the relative motion through the viscous material, and the relative velocity v thereof and inversely proportional to the gap h between the two surfaces. Therefore, the resisting force acts in the direction of stopping the motion of the movable plate 2 and the pipe P associated therewith according to various conditions of the lower surface of the movable plate 2 and the upper surface of the fixed flat plate 11. That is, the gap 5 is extremely small in height, and the area between the two surfaces has been made as large as possible. Accordingly, the resisting force F is greater and becomes great in proportion to the velocity, whereby the movable plate 2 and then the pipe P associated therewith are stopped in motion very quickly.

This tendency becomes more remarkable when a high molecular viscous material of high viscosity is used as the viscous fluid 6. This viscous material has a non-Newton fluid characteristic that is, a simulative plastic fluid characteristic (which is a phenomenon wherein, as the velocity of the fluid increases, a change is made from high viscosity to low viscosity to provide easy flowing, and the degree of increase in resisting force decreases. The resisting velocity is proportional to approximately 0.5 square of and the velocity), the occurrence of the resisting force is constant irrespective of amplitude of displacement and frequency if a velocity is the same. If the constant velocity is applied, said resisting force shows a rectangular wave-like rise and therefore is very sensitive to the vibration, thus providing an excellent quick-responsiveness. As a consequence, the motion of the pipe P is rapidly absorbed, and no stress harmful to each of constituting members of the support occurs.

Incidentally, with respect to the various particulars and the damping characteristic (damping coefficient) of the illustrated embodiment, assume that the largest outside diameter d of the movable plate 2 is 320 mm, the inside diameter D of the enclosure 12 is 450 mm and the vertical reaction of the support S is 2 tons. In tests with such an embodiment, it was possible to obtain a large damping characteristic i.e, the damping coefficient C was 326 kg.sec/cm.

It will be appreciated that modifications may be made in our invention.

For example, while the enclosure 12 is cylindrical in the present embodiment, it should be noted that the shape can be replaced with a square. In this case, the movable plate 2 must be moved freely within said square wall with the moving region left. Further, the movable plate can be modified into a square. Moreover, in the present embodiment, the movement of the movable plate 2 is made free in all directions, in the horizontal direction but said movement can be controlled only to one direction.

In addition, while the movable plate 2 in the present embodiment is composed of the large diameter movable plate lower portion 21 and the small diameter movable plate upper portion 22, this is because of the facts that the upper portion of the support is made as light as possible and that the dust-proof cover 7 can be conveniently mounted. If these conditions are free, the movable plate 2 can be composed of a disc having the same diameter.

Furthermore, in case the pipe P is a heat cooling pipe (for example, a liquefied natural gas piping, a vapor piping, etc.), a heat insulating plate can be interposed between the upper surface of the movable plate 2 and the lower surface of the support base 3 in order to prevent the characteristic of the viscous fluid 6 from being possibly adversely affected by suction and application of heat transmitted from the pipe P. Also, if said heat insulating plate is formed of a material having a resiliency, or a rubber plate is used in place of the heat insulating plate, it is also possible to absorb a rotational displacement or vertical vibration of the pipe P.

Accordingly, it should be understood that we intend to cover by the appended claims all modifications falling within the true spirit and scope of our invention.

What is claimed is:

1. A damping support for a piping system, said damping support comprising:
    (a) a fixed base having a recess portion defined by a cylindrical enclosure, said recess portion having a planar upper surface;
    (b) a movable disc-like member disposed within said recess portion, said movable disc-like member having a planar lower surface which is parallel to the planar upper surface of said recess portion and being sized so that it is movable horizontally in all directions within said recess portion;
    (c) first means for attaching said movable disc-like member to a pipe;
    (d) second means for spacing the planar lower surface of said movable disc-like member from the planar upper surface of said recess portion by an extremely small gap; and
    (e) a viscous material disposed in said recess portion and at least substantially filling the gap between the planar lower surface of said movable disc-like member and planar upper surface of said recess portion,
    (f) the height of said extremely small gap and the viscosity of said viscous material being such that horizontal movement of the pipe transmitted to said movable disc-like member by said first means is damped by a viscous shearing resistance force generated by said viscous material in said extremely small gap between the planar lower surface of said movable disc-like member and the planar upper surface of said recess portion.

2. A damping support as recited in claim 1, wherein said second means comprise spacers embedded in the planar lower surface of said movable disc-like member.

3. A damping support as recited in claim 1, wherein the vertical distance between the planar lower surface of said movable disc-like member and the planar upper surface of said recess portion is between 0.5 mm and 1 mm.

4. A damping support as recited in claim 1, wherein the viscous material is also present between the outer side surface of said movable disc-like member and the inner side surface of said recess portion, whereby movement of said viscous material between the outer side surface of said movable disc-like member and the inner surface side of said recess portion further damps horizontal movement of the pipe.

5. A damping support as recited in claim 4, wherein:

(a) said movable disc-like member is circular in horizontal cross-section and
(b) the difference between the diameter of the cylindrical enclosure which defines said recess portion and said movable disc-like member is on the order of 130 mm.

6. A damping support as recited in claim 1, wherein the viscous material is a fluid having a high viscosity.

7. A damping support as recited in claim 6, wherein the fluid is selected from the group consisting of polyisobutylene, polypropylene, polybutene, dimethylpolysiloxane, and asphalt.

8. A damping support as recited in claim 1, wherein said first means comprise:
(a) a flat horizontal plate removably mounted on said movable disc-like member;
(b) a pair of spaced vertical wall plates mounted on the upper surface of said flat horizontal plate, the upper surfaces of said spaced vertical plates being shaped to receive the pipe; and
(c) a central vertical connecting plate mounted on the upper surface of said flat horizontal plate and connected at each end to one of said pair of spaced vertical wall plates.

9. A damping support as recited in claim 1, and further comprising third means for covering the upper surface of said recess portion to prevent contamination of said viscous material.

10. A damping support for an object to protect it from horizontal vibrations, said damping support comprising;
(a) a fixed base having a recess portion, said recess portion having a planar upper surface;
(b) a movable member disposed within said recess portion, said movable member having a planar lower surface which is parallel to the planar upper surface of said recess portion and being sized and shaped so that it is movable horizontally in at least one direction within said recess portion;
(c) first means for attaching said movable member to the object to be protected;
(d) second means for spacing the planar lower surface of said movable member from the planar upper surface of said recess portion by an extremely small gap; and
(e) a viscous material disposed in said recess portion and at least substantially filling the gap between the planar lower surface of said movable member and the planar upper surface of said recess portion,
(f) the height of said extremely small gap and the viscosity of said viscous material being such that horizontal movement of the object to be protected transmitted to said movable member by said first means is damped by a viscous shearing resistance force generated by said viscous material in the extremely small gap between the planar lower surface of said movable member and the planar upper surface of said recess portion.

11. A damping support as recited in claim 10, wherein said second means comprises spacers embedded in the planar lower surface of said movable member.

12. A damping support as recited in claim 10, wherein the vertical distance between the planar lower surface of said movable member and the planar upper surface of said recess portion is between 0.5 mm and 1 mm.

13. A damping support as recited in claim 10, wherein the viscous material is also present between the outer side surface of said movable member and the inner side surface of said recess portion, whereby movement of said viscous material between the outer side surface of said movable member and the inner side surface of said recess portion further damps horizontal movement of the object to be protected.

14. A damping support as recited in claim 13, wherein:
(a) said movable member is circular in horizontal cross-section;
(b) said recess portion is circular in horizontal cross-section; and
(c) the difference between the diameters of said movable member and said recess portion is on the order of 130 mm.

15. A damping support as recited in claim 10, wherein the viscous material is a fluid having a high viscosity.

16. A damping support as recited in claim 15, wherein the fluid is selected from the group consisting of polyisobutylene, polypropylene, polybutene, dimethylpolysiloxane, and asphalt.

17. A damping support as recited in claim 10, wherein said first means comprise:
(a) a flat horizontal plate removably mounted on said movable member;
(b) a pair of spaced vertical wall plates mounted on the upper surface of said flat horizontal plate, the upper surfaces of said spaced vertical wall plates being shaped to receive the object to be protected; and
(c) a central vertical connecting plate mounted on the upper surface of said flat horizontal plate and connected at each end to one of said pair of spaced vertical wall plates.

18. A damping support as recited in claim 10, and further comprising third means for covering the upper surface of said recess portion to prevent contamination of said viscous material.

19. A damping support as recited in claim 10, wherein said movable member is sized and shaped so that it is movable horizontally in all directions within said recess portion.

* * * * *